Figure 1:
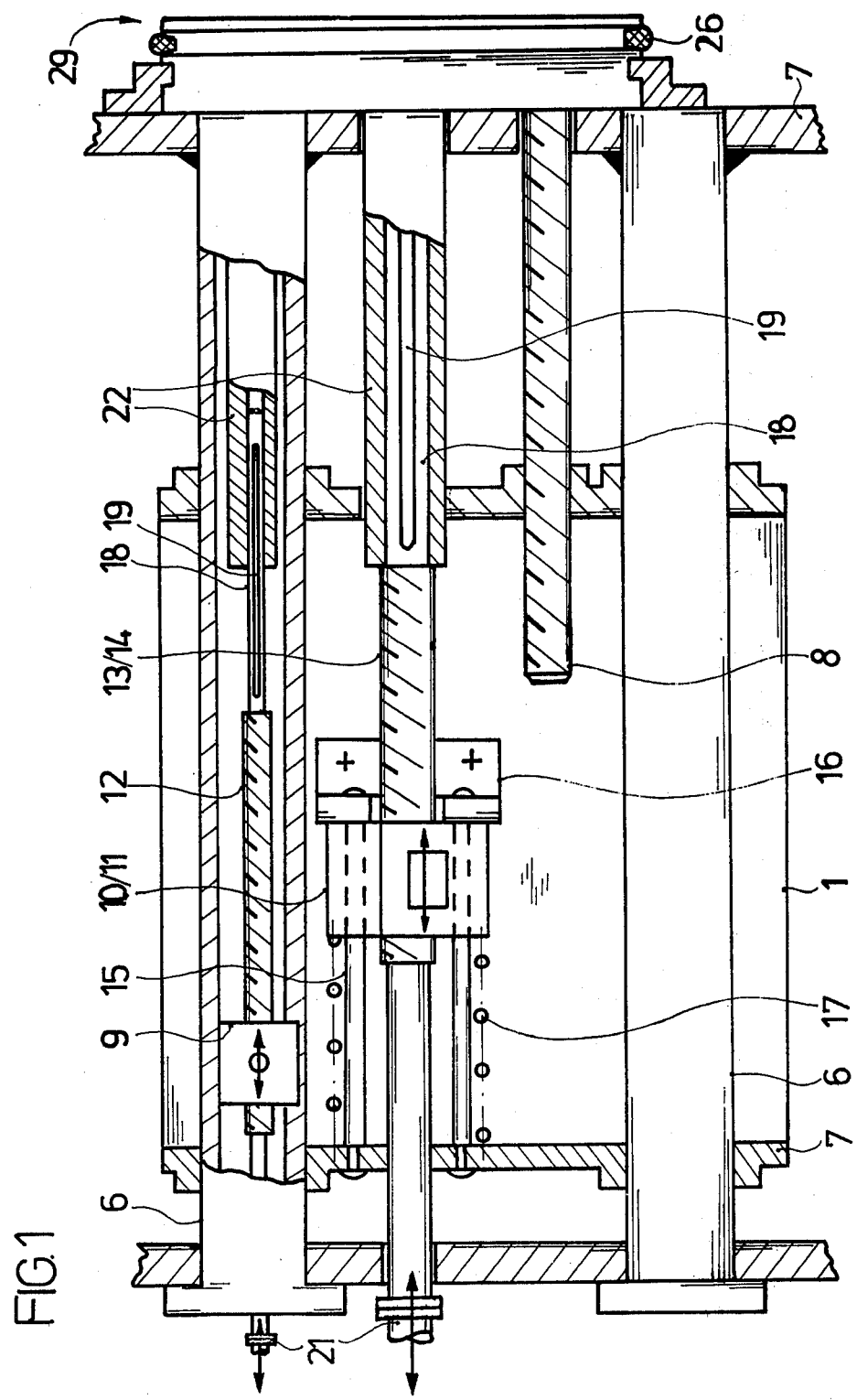

United States Patent [19]

Pretsch

[11] 4,424,719
[45] Jan. 10, 1984

[54] POSITIONING MECHANISM FOR THE PEDALS OF POWERED VEHICLES

[76] Inventor: Norbert Pretsch, Stephanstrasse 1, 8871 Kammeltal-Behlingen, Fed. Rep. of Germany

[21] Appl. No.: 937,865

[22] Filed: Aug. 29, 1978

[30] Foreign Application Priority Data

Sep. 21, 1977 [DE] Fed. Rep. of Germany ....... 0742380

[51] Int. Cl.³ .......................................... F16H 37/06
[52] U.S. Cl. ................................ 74/89.15; 74/665 G
[58] Field of Search ............... 74/89.15, 665 F, 665 G, 74/424.8 R

[56] References Cited

U.S. PATENT DOCUMENTS 1,748,948  3/1930  Gassen ........................ 74/424.8 R
2,905,011  9/1959  Armstrong et al. ........... 74/424.8 R
3,190,146  6/1965  Sorensen et al. .............. 74/89.15

FOREIGN PATENT DOCUMENTS 1188954  5/1963  Fed. Rep. of Germany .
1270962  4/1965  Fed. Rep. of Germany .
7008860  4/1973  Fed. Rep. of Germany .

Primary Examiner—Kenneth Dorner
Attorney, Agent, or Firm—Max Fogiel

[57] ABSTRACT

An arrangement for adjusting the pedals of a motor vehicle in relation to the seat of the driver, in which a movable carriage carries the pedals and terminal members of associated actuating mechanisms coupled to each. The carriage can be positioned by an adjusting spindle, and a threaded sleeve is provided for each pedal and is movably mounted on the carriage. The carriage and the threaded sleeve are uniformly displaceable by a common drive. A threaded rod passes through each threaded sleeve associated with it, and is connected at one end to linkage leading to the pedals. The threaded rods are substantially stationary in axial direction thereof. They are all rotated uniformly for adjusting the threaded sleeves so that linkages associated with the pedals remain in position when the carriage is displaced. Driving elements are connected to the other ends of the threaded rods and are driven in the same manner as the adjusting spindle.

12 Claims, 3 Drawing Figures

U.S. Patent   Jan. 10, 1984   Sheet 3 of 3   4,424,719

POSITIONING MECHANISM FOR THE PEDALS OF POWERED VEHICLES

The invention concerns a mechanism for adjusting the position of the pedals of powered vehicles which incorporates a movable cradle to carry the pedals and the terminal members of the actuating mechanisms coupled to them.

In powered vehicles equipped with a pedal positioning mechanism of this type, it is possible for the seat to be more rigidly installed without the individual adjustability of the distance between the driver's seat and the pedals being affected. This is both advantageous and, in the light of safety considerations, highly desirable.

From DE-GM No. 7 008 860 an arrangement of the type mentioned at the outset is already known, whereby the carriage carrying the pedals forms part of the floor of the vehicle and by means of a Bowden cable is moved back and fore along an appropriate rail guidance system. The pedals are similarly connected to the appropriate vehicle assemblies by means of a Bowden cable.

The rail guidance system of the movable carriage used here is highly endangered by dirt and so requires constant surveillance, quite apart from the fact that the Bowden cables used in the known arrangement are highly defect-prone and at risk since they are practically without guidance and are dragged along while completely freely suspended so that the risk of nipping and jamming cannot be excluded with any certainty. This may also be the reason why arrangements of this kind have not so far been introduced in practice.

One has already, therefore, also made do with arrangements that manage without so-called Bowden cables. An arrangement of this type is, for example, known from DT-AS No. 1 188 954 whereby the pedal bearing shaft is to all intents and purposes in the form of a swinging shaft that is suspended so as to swing exactly from the point at which the linkage rods change direction. With horizontal swings of this magnitude one effects not only the desired change in the distance between the pedals and the driver's seat but, at the same time, one also effects a change in the relative angle at which the pedals stand and, particularly where the distance between the driver's seat and the pedals is large, a relatively flat pedal disposition has to be accepted, which requires an extremely tiring leg posture which, particularly when the seat is near to the floor, is extremely detrimental.

A further proposal is known from DT-AS No. 2 125 826. With this arrangement, the suspended swinging pedal levers are sus-divided with each part adjustable relative to the other. To achieve an adjustment of this nature, a spindle secured on a suitable shoulder on the first half of the lever engages with a threaded sleeve in the second movable half of the lever. From this description it will be seen that with this arrangement the effective lever arm changes according to the positioning of the second half of the lever so that, with differing pedal settings, differing actuating forces will be applied.

Quite apart from this, there is also, with the known arrangement, a heavy bending load on the spindle which can easily result in permanent distortion and so lead to highly restricted functionability. A further disadvantage of this known arrangement is that when the pedal is actuated, the spindle together with its mounting is also swung horizontally. This can easily lead to a collision with the leg actuating the pedal, etc.

An arrangement has also already been proposed (DT-AS No. 1 270 962) in which a movable carriage which forms almost a second floor is freely suspended from a spindle secured to the steering column in such a manner as to be movable. This can clearly lead to an excessively heavy bending load being applied to the spindle. The linkage elements between the pedals and the appropriate vehicle assemblies are here also to be in the form of so-called Bowden cables whose disadvantages have already been detailed further above to which reference can be made to avoid repetition.

On the other hand, so-called servo-assemblies are also spoken of which, however, require an extremely expensive construction both in respect of interconnection and control technology.

In the light of the above, the object of the present invention is to contrive a positioning mechanism of the type referred to at the outset, avoiding the disadvantages of the known arrangements and being not only of simple, space saving and compact construction and simple in operation but also ensuring a high degree of easy-maintenance operation with a degree of functionability over very long periods previously unobtainable. At the same time it should ensure a non-fatiguing leg posture in every setting or operating position and avoid with certainty a leg coming in collosion with movable parts.

The problem is solved according to the invention in a suprisingly simple manner in that the carriage, which can be positioned by means of a drivable spindle that is in itself known, has for each pedal a threaded sleeve that is capable of being moved by the pedal associated with it and in which the terminal fittings of the linkages associated with each of the actuating mechanisms connected to each of the pedals is in each case in the form of a threaded rod which passes through the threaded sleeve associated with it and which is at one end connected to and free to turn in relation to a further extending linkage element and at the other end is telescopically connected to a drive element to which it is keyed so that it turns with it and which, in each case, has the same thread pitch as the adjusting spindle and is capable of being driven in the same manner as the adjusting spindle.

These measures provide in an advantageous manner a strong and thus highly functionable linkage connection which ensures uninterrupted engagement with unaltered linkage settings so that, in an advantageous manner, the full functionability of the pedal control is ensured even also during repositioning of the pedals which is an extremely positive feature in the light of safety considerations. At the same time it is also thereby ensured that the relative attitude of the pedals remains unchanged throughout the whole range of positioning so as to permit an equally comfortable leg posture whatever the position of the carriage, whereby whereby drive fatigue is effectively avoided. A further advantage of the measures covered by the invention can be seen in the complete pedal freedom thereby made possible which permits of rapid and positive pedal operation.

The measures covered by the invention can clearly be effected without any appreciable interference with existing linkage designs which can be of considerable advantage in cases of subsequent modification.

The strong spindle arrangement makes it possible to achieve a precise even drive by means of a simple gear unit.

A development of the measures set out above that has proved of particular utility is one in which the axes of the threaded rods and of the adjusting spindle are arranged in a circle. With such an arrangement, it is a simple matter to provide each of the drive elements and the adjusting spindle with a gear pinion of similar diameter which can easily be brought into engagement with a common drive wheel to provide a drive requiring remarkably few parts and of extremely simple construction. It is convenient to arrange the drive wheel as an internally toothed cover which ensures extremely simple assembly and a clean accommodation of the gearing.

A further development of the above detailed measures that is of particular utility can consist of arranging the pinions associated with the threaded rods to be fixed to bushes that are secured in an axial direction and into which the threaded rods engage telescopically in such a manner as to turn with the bushing. This measure provides, in an advantageous manner, a clean longitudinal guidance system, protected against dust, without direct engagement between the pinions and the threaded rods to permit a very simple pinion mounting.

Another advantageous measure can be to arrange that at least the threaded sleeves associated with the brake and clutch pedals are carried on longitudinal guideways secured to the carriage. This not only ensures excellent protection against twisting but also effectively avoids any deflection of the threaded rods. At the same time, these measures ensure an extremely precise zero adjustment of the entire actuating mechanism. It is additionally advantageous, at least for each of the guided threaded sleeves, to fit a return spring abutting against the carriage to act against a limit stop for the longitudinal guides that is secured to the carriage.

In an advantageous further development of the measures set out above, the carriage can, with considerable advantage in respect to space required, be secured in a housing chamber that is open at the sides. These measures ensure not only clean and stable carriage guidance but also secure an absolutely clear floor so that the floor of the vehicle can continue to be provided with appropriate stiffening corrugations, etc., irrespective of the positioning device covered by the invention.

A further quite different and particularly advantageous development of the above detailed measures consists in the carriage being provided with a cantilevered pedal carrier to one side on which at least the first pedal, preferably the brake pedal, is carried on a bushing that is provided at its carriage end with an actuating fork to work in conjunction with its associated threaded sleeve and through which pedal carrier the other pedal cranks each pass, each having an actuating fork at its carriage end to work in conjunction with its associated threaded sleeve.

Further features and advantages of the measures according to the invention emerge from the following description of a design example with the aid of the drawing in conjunction with the claims.

Here

Figure 2:
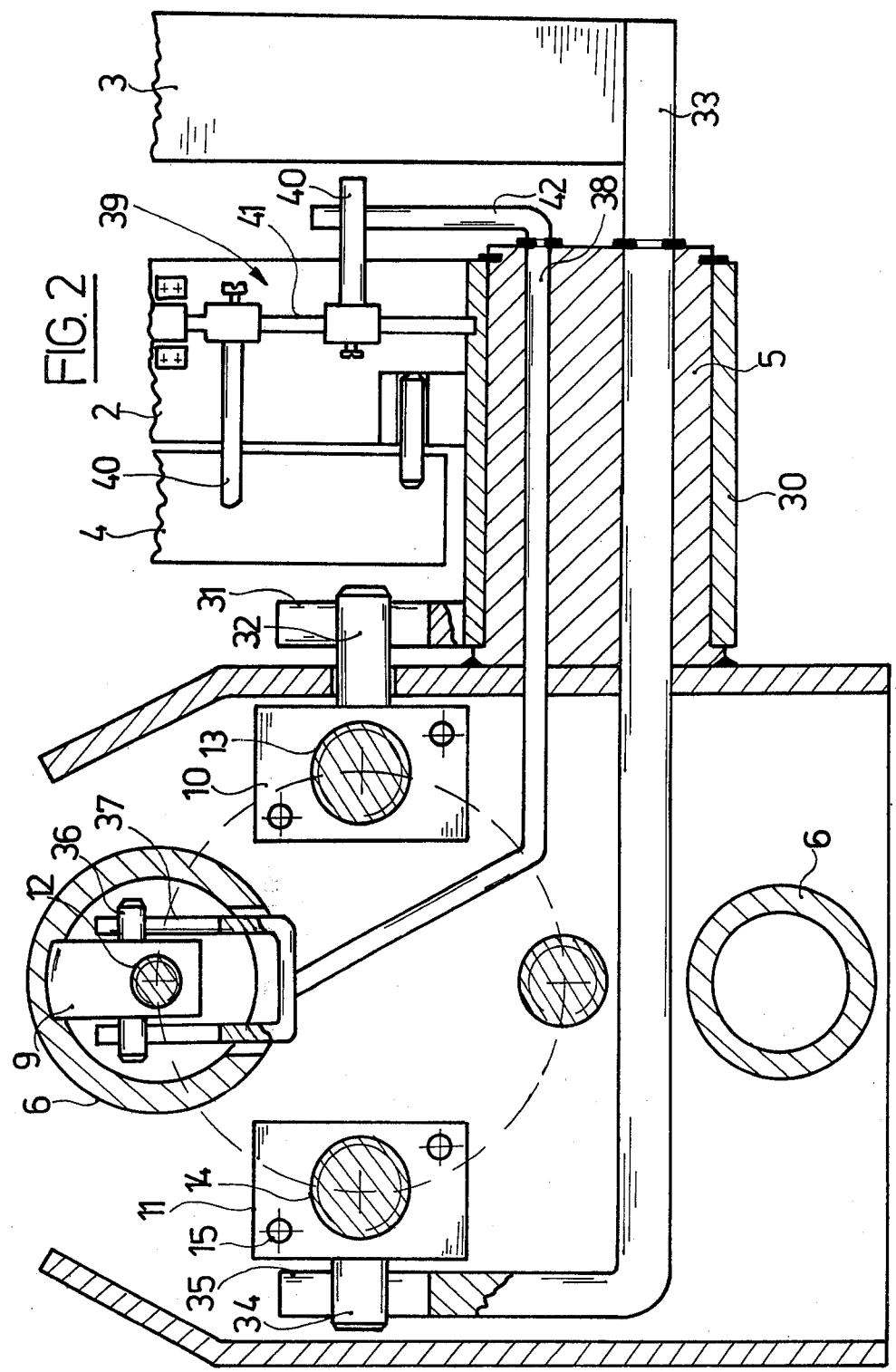
Figure 3:
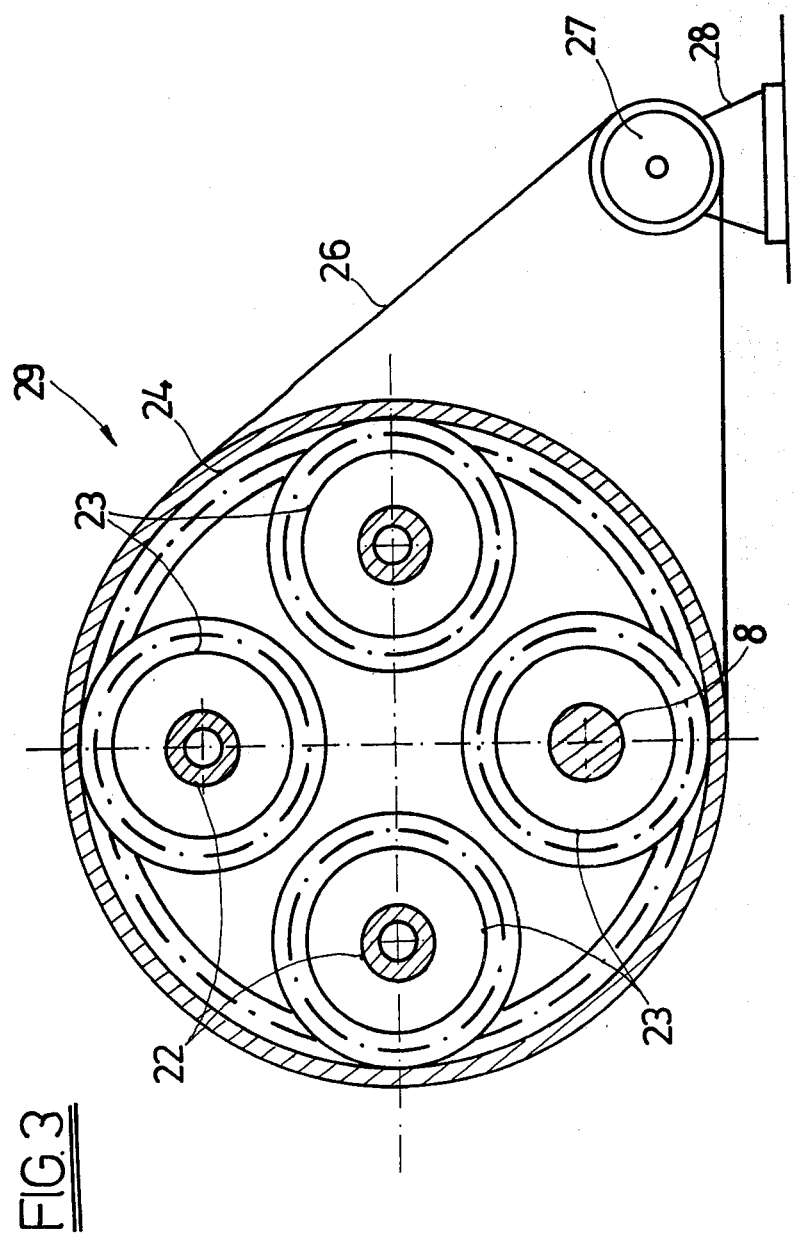

FIG. 1 shows a schematic representation of a side view of a positioning mechanism in accordance with the invention partially in section, FIG. 2 shows a cross section through the arrangement in accordance with FIG. 1 in the axial region of the threaded sleeves and FIG. 3 shows a cross section through the arrangement in accordance with FIG. 1 in the axial region of the drive mechanism.

This arrangement in accordance with the invention is comprised as is clearly to be seen in FIGS. 1 and 2 of a carriage 1 here somewhat in the form of an open framework that carries the pedals for actuating the brake, clutch and accelerator. The brake pedal is designated with number 2, the clutch pedal with the number 3 and the accelerator pedal with the number 4. To carry the pedals 2 to 4, a cantilevered pedal carrier 5, to be described in more detail below, is provided to one side of the carriage. The carriage 1 is movably mounted on guide rails 6 that should extend more or less in the lengthwise direction of the vehicle.

To carry the carriage 1 it is advantageous to provide an open housing, open on the pedal side, carrying the guide rail tubings 6 as this allows for clean and space-saving accommodation of the carriage 1. The housing walls are indicated with the FIG.,7 in FIG. 1.

The guide rails 6 can advantageously be so disposed that the carriage 1 leaves the floor completely free which ensures that there is complete freedom in the design of the floor of the vehicle.

As a means of moving the carriage 1 along the longitudinal guideway provided by the guide rails 6, an adjusting spindle 8 coupled to a drive mechanism is provided that is to be described in more detail below and that is shown in the design example represented simply as a spindle engaging in a threaded hole provided in the adjacent carriage wall. Here it would, of course, also be possible to have a through-bolt secured firmly to the carriage to work in conjunction with a driven threaded sleeve.

By axial displacement of the carriage 1 it is clear that the pedals 2 to 4 can be brought to the desired distance from the driver's seat that here can to advantage be rigidly fixed in place.

Each of the pedals 2 to 4 is coupled by means of an actuating linkage to its associated vehicle assembly. For this purpose the threaded sleeves 9 to 11 associated one each with the pedals 2 to 4 are provided in the carriage 1 with each connected to its associated pedal by means of a crank mechanism to be further described. The threaded sleeve designated by the FIG. 9 is associated with the accelerator pedal 4 and those designated with the FIGS. 10 and 11 with the brake pedal 2 and the clutch pedal 3.

The threaded sleeves 9 to 11 associated with the pedals 2 to 4 each engage with an actuating rod 12 to 14 extending into the carriage and which in each case forms the terminal member of an actuating linkage. These threaded rods should be so designed as to be able, without question, to carry the necessary actuating forces.

In the design example represented, the threaded rods 13 and 14 associated with the brake pedal 2 and the clutch pedal 3 are shown as being of about equal strength. The threaded rod 12 engaging with the threaded sleeve 9 associated with the accelerator pedal 4 can be of weaker construction in view of the not unappreciably lesser actuating forces that here apply.

To relieve the load on the threads, the threaded sleeves that have to transmit higher actuating forces can to advantage be carried on guide elements secured to the carriage. Thus in the design example represented, threaded sleeves 10 and 11 associated with the brake pedal 2 and the clutch pedal 3 are mounted so as to be able to move on guide pins 15 so that bending loads are not applied to the associated threaded rods 13 and 14 and, at the same time, excellent turning qualities are achieved for the threaded sleeves 10 and 11.

The clear length of the guide pins 15 is about equal to the actuating movement of the pedals 2 and 3. In the design example represented, this actuating movement is limited by an angled stop 16 against which the associated threaded sleeve 10 or 11 is clearly to be seen in FIG. 1 held against it by means of a return spring 17 resting against the carriage 1. The angle stop can serve at the same time as a support for the guide pins 15 which are supported at their opposite ends by the carriage wall.

The thread of the threaded rods 12 to 14 with also their respective threaded sleeves 9 to 11 with which they are engaged should have the same pitch as the thread of the adjusting spindle 8 and should be able to be driven at a similar speed to that of the adjusting spindle 8 by a drive mechanism to be described in greater detail below. Thus, as soon as the drive mechanism is in motion there is a similar longitudinal movement of the carriage 1 and the threaded sleeves 9 to 11 so that their position relative to one another, even as a result of a longitudinal movement of the carriage 1, remains unchanged. The zero setting of the linkages actuating the various vehicle assemblies thus remains, in an advantageous manner, unaffected by a change in the position of the carriage 1 and with it of the pedals 2 to 4.

At the same time, however, screwed connection between the threaded sleeves and their associated threaded rods in accordance with the invention ensures a positive locking of positions so that it is not only unnecessary to readjust and secure the threaded sleeves after every repositioning operation but, at the same time, even during a position changing operation, reliable pedal control is possible which is most highly desirable from the point of view of driving comfort and road safety.

In order to achieve a reliable drive with the facility of equal longitudinal movement, the threaded rods 12 to 14 are each provided at their drive ends with an inserted connection piece 18 that is arranged to engage telescopically and, here by means of a key and groove connection designated by the FIG. 19, to turn together with its associated drive element.

By means of such telescopic connections interconnected so that both halves turn together, it is ensured that the threaded rods 12, 13 and 14 can not only be reliably driven when the pedals are in their rest positions but also when the pedals are fully actuated as is clearly shown in FIG. 1 in respect of the threaded rod 12 associated with the accelerator pedal 4. The extent to which the connection pieces 18 can be withdrawn is approximately equal to the actuating movement of the associated pedal in each case.

At the ends of the threaded rods 12, 13 and 14 opposite to their drive ends, each has a swiveling connectiion designated with the number 20, in each case connecting it to a further extending member 21 of its associated linkage.

In the design example represented, in order to carry the connection pieces 18, drive bushes 22 are provided which are so secured that they cannot move in a longitudinal direction and by means of which the opposite end of each associated threaded rod together with the connection piece 18 is driven. As is clearly shown in FIG. 3, the drive bushes 22 and the adjusting spindle 8 are, for this purpose, each provided with a pinion 23 of similar diameter and these pinions engage in a planetary manner with a common drive wheel 24. The arrangement of the threaded rods 12, 13 and 14 and the adjusting spindle 8 is thus advantageously so arranged that the axes of these components lie in a circle.

The common drive wheel 24 can be arranged somewhat as a centrally arranged sun wheel that engages with all four associated pinions 23. In the design example represented the common drive wheel 24 is expediently designed as an internally toothed annulus which permits of a particularly strong gear system. To connect the drive wheel 24 with a drive motor, this could be brought into engagement with a further pinion on the motor shaft. In the design example represented, a belt drive is provided for which purpose the drive wheel 24 is provided on its outer diameter with a recess 25 for a V-belt 26 which also runs over a drive wheel 27 of a drive motor 28.

With an arrangement of this kind, it is a simple matter to arrange the drive wheel 24 as a cover closed at the front which, as can be seen in FIG. 1, can advantageously be mounted so that it can turn on the rear housing wall 7. In such an arrangement the drive bushes 22 and the adjusting spindle 8 are led through the rear housing wall. The length of the drive bushes 22 and of the adjusting spindle 8 is clearly determined by the desired length of movement of the carriage 1.

In the design example represented in FIG. 1, the carriage 1 is shown advanced almost to its front position. If the carriage 1 and with it the pedals 2 to 4 have to be moved back to match the length of a particular driver's legs, it is only necessary to start the drive motor 28. For the purpose a suitable switch can advantageously be provided in the vicinity of the instrument panel. As soon as the drive mechanism, designated as a whole with the number 29, is set in motion, the adjusting spindle 8 pulls the carriage back to the required position. The threaded rods 12, 13 and 14, each of which is provided with a pinion of similar size to that of the adjusting spindle 23 so that it will be driven at the same speed, ensure that the threaded sleeves 9, 10 and 11 with which they engage, are also moved back without the adjustment of the threaded rods or of any further extending linkage component being altered in any way. The thread engagement ensures at the same time, as explained already in more detail above, an exact location of the associated threaded sleeves during the whole repositioning operation.

As is clearly shown in FIG. 2, the pedal carrier 1 is in the form of a cantilevered trunnion to one side of the carrier 1. In the design example represented, on this trunnion forming the pedal carrier 5 is mounted a bush 30 which carries the brake pedal 2 in such a manner that it can be suitably moved. The bush 30 is provided with a fork-shaped actuator 31 at its carriage end into which there engages a lug 32 which is set into the side of the associated threaded sleeve 10 and which passes through an aperture in the wall of the carriage.

The pedal carrier 5 is further provided with an axial bore through which a crank mechanism 33 passes that carries the clutch pedal 3. The crank 33 is extended at its carriage end to the vicinity of its associated threaded sleeve 11 which is similarly provided with a lug 34 to one side which engages with the forked actuator 35 of the crank 33.

The threaded sleeves 10 and 11 associated with the brake pedal 2 and the clutch pedal 3 lie somewhat in the manner of mirror images one to another but the lug 34 of the threaded sleeve 11 furthest from the pedal carrier does not pass through the wall of the carriage. This in only necessary in the case of the lug working in association with the bush 30 carried on the pedal carrier 5.

The threaded sleeve 9 associated with the accelerator pedal 4 can conveniently be integrated into one of the guide tubes 6 in order to save space. The threaded sleeve 9 is provided with lugs 36 at the side which act in conjuction with the forked actuator 37 secured to a crank 38 which similarly passes through the pedal carrier 5 and works in conjunction with the accelerator pedal 4.

In the design example represented, the accelerator pedal 4 is mounted on the brake pedal 2 in order to obviate the need to change pedals when it is necessary to brake quickly. To connect the accelerator pedal 4 with the crank 38 passing through the pedal carrier 5, a two-armed rocking yoke, designated as a whole by the number 39, is provided that is similarly mounted on the brake pedal. This provides for the control movements developed by the brake pedal 2 and the accelerator pedal 4 counteracting one another so that when the brake pedal 2 is actuated, an automatic control movement in the direction that withdraws acceleration is also effected.

The arms 40 of the rocking yoke 39 can, to advantage, be made adjustable on the yoke axis 41 which lies approximately vertical to the pedal carrier 5. This permits, in an advantageous manner, the achievement of the leverage ratio that is required.

In the design example represented, the crank 38 in the region of its free end is simply provided with a suitable elbow 42 which works in conjunction with the associated arm 40 of the rocking yoke 39. In place of a lever connection of this type, it would also be a simple matter to provide a gear wheel connection for which purpose the shaft 41 and the crank 38 could be provided with toothed gear segments engaging with one another.

Although the above explains in detail a preferred design example, it does not, however, imply that there should be any restriction. It is far more the case that a series of possibilities are available to the expert to match the general ideas of the invention to the conditions of individual applications.

So, for example, in order to save space, in place of the actuating forks shown for actuating the threaded sleeves 9 to 11, it would easily be possible to provide gear segments, each associated on its sleeve end with a suitable gearing. This could be more or less directly on the appropriate sleeve or could also be formed on a connected pin. It would of course also be possible to support the crank 33 and 38 at both ends, i.e. also against the rear carriage wall, if this should be necessary.

To exclude dust, etc. the carriage could be encapsulated by suitable covers, preferably of plastic.

A detachable mounting for the guide rods 6, possibly with the aid of circlips, could appreciably simplify assembly and disassembly of the carriage.

In some cases it could prove advantageous for space saving reasons also to have a suspended arrangement of the pedals instead of the standing arrangement represented.

I claim:

1. Positioning mechanism for the pedals of motor vehicles comprising: a movable carriage carrying pedals and terminal members of associated actuating mechanisms coupled to each, an adjusting spindle for positioning said carriage, a threaded sleeve for each pedal and arranged so as to move with the pedal associated to it, each said sleeve having terminal fittings of linkages associated with each of actuating mechanisms connected to each of the pedals, each terminal fitting having a threaded rod passing through the threaded sleeve associated with it and being connected at one end in a free-to-turn relationship to an extending linkage element, a drive element, said threaded rod being connected at the other end telescopically to said drive element, said threaded rod being keyed to said drive element so that the rod turns with the drive element, the threaded rods having the same thread pitch as said adjusting spindle, said drive elements being driven in the same manner as the adjusting spindle, said carriage and each said threaded sleeve being uniformly displaceable by common drive means and said threaded rods being substantially stationary in axial direction thereof, said threaded rods being all rotated uniformly for adjusting the threaded sleeves and said adjusting spindle so that linkages associated with the pedals remain in position when said carriage is displaced, said pedals being actuatable even when said carriage together with said pedals are in motion, said threaded sleeves being mounted movably on said carriage so that said threaded sleeves are moved relative to said carriage upon actuation of said pedals, pinions associated with the threaded rods being fitted to drive bushings that are secured against moving in an axial direction and into which the threaded rods engage telescopically in keyed relationship so that the bushings and threaded rods turn together, said carriage having a cantilevered pedal carrier to one side on which at least a first pedal is mounted by a bushing on a carriage side, said bushing having a fork operating in conjunction with the associated threaded sleeve, cranks associated with the other pedals and passing through said bushing, each crank having a fork acting in conjunction with its associated threaded sleeve, guide rods, said carriage being guided on said guide rods, a housing, said guide rods being secured to said housing.

2. Positioning mechanism according to claim 1 wherein the axes of said threaded rods and said adjusting spindle are arranged in a circle.

3. Positioning mechanism in accordance with claim 2 wherein the drive elements of the threaded rods and adjusting spindle are each provided with a pinion of similar diameter, said pinion engaging a common drive wheel.

4. Positioning mechanism in accordance with claim 3 wherein said drive wheel is arranged as an internally toothed cover.

5. Positioning mechanism in accordance with claim 1 wherein at least two threaded sleeve are associated with a brake pedal and a clutch pedal and are carried on longitudinal guides secured to said carriage.

6. Positioning mechanism in accordance with claim 5 wherein at least said two threaded sleeves have each a return spring abutting against said carriage and a stop secured to said carriage.

7. Positioning mechanism in accordance with claim 1 wherein the threaded sleeves have actuating lugs at their sides engaging with forked, pedal-operated actuators.

8. Positioning mechanism in accordance with claim 1 wherein a clutch pedal is mounted on a crank passing through the pedal carrier.

9. Positioning mechanism in accordance with claim 1 wherein an accelerator pedal is mounted on a brake pedal and is coupled to a crank with its associated fork by a two-armed rocking yoke pivoted on an approximately vertical axis.

10. Positioning mechanism in accordance with claim 9 wherein said rocking yoke has at least one arm arranged to be adjustable.

11. Positioning mechanism in accordance with claim 1 wherein said guide rods are arranged in a chamber of said housing, said chamber being open at the sides.

12. Positioning mechanism in accordance with claim 1 wherein at least one of the guide rods carriers the threaded sleeve and its associated threaded rod.

* * * * *